(12) United States Patent
Keeton

(10) Patent No.: US 10,596,653 B2
(45) Date of Patent: Mar. 24, 2020

(54) CUTTING WATER TABLE AND METHODS OF USE

(71) Applicant: Richard Keeton, Houston, TX (US)

(72) Inventor: Richard Keeton, Houston, TX (US)

( * ) Notice: Subject to any disclaimer, the term of this patent is extended or adjusted under 35 U.S.C. 154(b) by 689 days.

(21) Appl. No.: 15/299,060

(22) Filed: Oct. 20, 2016

(65) Prior Publication Data

US 2017/0106480 A1    Apr. 20, 2017

Related U.S. Application Data

(60) Provisional application No. 62/244,063, filed on Oct. 20, 2015.

(51) Int. Cl.
| | | |
|---|---|---|
| *B23K 10/00* | (2006.01) | |
| *B23K 37/04* | (2006.01) | |
| *B24C 1/04* | (2006.01) | |
| *B26D 7/20* | (2006.01) | |
| *B26F 3/00* | (2006.01) | |

(52) U.S. Cl.
CPC .......... *B23K 10/00* (2013.01); *B23K 37/0408* (2013.01); *B24C 1/045* (2013.01); *B26D 7/20* (2013.01); *B26F 3/004* (2013.01)

(58) Field of Classification Search
CPC .... B23K 10/00; B23K 37/0408; B24C 1/045; B26D 7/20; B26F 3/004
USPC ....................................... 219/121.58; 266/49
See application file for complete search history.

(56) References Cited

U.S. PATENT DOCUMENTS

| | | | | |
|---|---|---|---|---|
| 2,716,506 | A * | 8/1955 | Fike ...................... | F16K 17/162 220/89.2 |
| 3,743,260 | A * | 7/1973 | Alleman .................. | B23K 7/10 266/49 |
| 3,851,864 | A * | 12/1974 | Miller .................... | B23K 10/00 219/121.39 |
| 4,097,713 | A * | 6/1978 | Dunshee ................ | B23K 7/002 219/121.39 |
| 4,162,060 | A * | 7/1979 | Anderson .............. | B23K 7/002 266/49 |
| 4,453,702 | A * | 6/1984 | Anderson .............. | B23K 7/002 266/49 |
| 4,633,055 | A * | 12/1986 | Conley .............. | B23K 37/0461 219/121.38 |
| 4,740,668 | A * | 4/1988 | Perez ................... | B23K 10/006 219/121.39 |
| 4,776,571 | A * | 10/1988 | Lougee .................. | B23K 7/002 266/49 |
| 4,887,797 | A * | 12/1989 | Karow .................... | B23K 7/10 266/49 |

(Continued)

*Primary Examiner* — Viet Le

(74) *Attorney, Agent, or Firm* — Matthews, Lawson, McCutcheon & Joseph, PLLC

(57) ABSTRACT

A water table for cutting metallic materials comprises an upper water pool supported above a false vessel bottom. The surface of the upper pool water volume is regulated relative to workpiece support rails secured above the upper pool surface. An actual vessel bottom is positioned below the false bottom and supports a lower pool volume. Bearing directly upon the lower pool surface is an enclosed air pressure volume regulated by an air supply source. The upper and lower pool volumes are hydraulically linked by flow conduits. A frangible rupture disc in a pressure release vent assures an absolute pressure limit within the air volume to avoid over-pressurization or under-pressurization of the water table.

16 Claims, 3 Drawing Sheets

(56) References Cited

U.S. PATENT DOCUMENTS

| | | | | |
|---|---|---|---|---|
| 4,926,792 A * | 5/1990 | Bell | ................ | A44C 27/006 |
| | | | | 118/50 |
| 4,986,515 A * | 1/1991 | Anderson | ............ | B23K 7/002 |
| | | | | 266/49 |
| 5,013,884 A * | 5/1991 | Hahn | ................ | B23K 7/002 |
| | | | | 219/121.39 |
| 5,167,903 A * | 12/1992 | Anderson | ............ | B23K 7/10 |
| | | | | 266/49 |
| 5,205,316 A * | 4/1993 | Pruett | ................ | F04F 1/06 |
| | | | | 137/209 |
| 6,072,163 A * | 6/2000 | Armstrong | ........ | H01L 21/67103 |
| | | | | 118/724 |
| 6,222,155 B1 * | 4/2001 | Blackmon | ............ | B23K 7/002 |
| | | | | 219/121.39 |
| 6,387,320 B1 * | 5/2002 | Poulin | ............ | B23K 7/10 |
| | | | | 266/48 |
| 7,985,369 B2 * | 7/2011 | Crees | ................ | B08B 15/00 |
| | | | | 266/49 |
| 8,598,486 B2 * | 12/2013 | Kim | ................ | C21B 13/002 |
| | | | | 219/121.36 |
| 9,000,321 B2 * | 4/2015 | Yamaguchi | ............ | B23K 7/002 |
| | | | | 219/121.58 |
| 2011/0049102 A1 * | 3/2011 | Kroll | ............ | H01J 37/32091 |
| | | | | 216/71 |
| 2014/0346152 A1 * | 11/2014 | Sasaki | ............ | H01L 21/6831 |
| | | | | 219/121.58 |

\* cited by examiner

CUTTING WATER TABLE AND METHODS OF USE

CROSS-REFERENCE TO RELATED APPLICATIONS

This is a non-provisional U.S. Patent Application, claiming benefit and priority to Provisional U.S. Patent Application No. 62/244,063, filed Oct. 20, 2015, entitled "Plasma Arc Cutting Water Table And Methods Of Use," and the contents of which are incorporated in their entirety by reference.

FIELD OF THE INVENTION

The present invention relates generally to workpiece support tables and platforms having particular utility for cutting processes using plasma arc cutters, laser cutters, oxy-fuel cutters, abrasive water jet cutters, and other Computer Numerical Controlled (CNC) means. More specifically, the invention relates to failsafe apparatuses and methods of use for controlling the pressure and volume of water tables, which are served by a variable surface height water bath for the purpose of fume suppression and slag capture.

BACKGROUND OF THE INVENTION

To control the workplace sanitation and atmosphere of a CNC work environment, workpiece support tables for CNC cutters have been developed to contain a water bath or pool beneath the workpiece support surface. The support surface often comprises a multiplicity of flat bar or angle edges characterized herein as workpiece support rails.

In the example of plasma arc cutting, the "kerf" of a material cut from a whole is that portion of the material that is removed in fine particles, such as by a saw, or by melting, such as by a cutting torch. At 15,000° C. to 25,000° C., the plasma arc cutting process not only melts the kerf of a metal workpiece, but also partially vaporizes the metal. Consequently, metallic workpieces, especially material removed from within the kerf, become either solid material slag or noxious vapors. Fortunately, some of the metallic vapors produced by plasma arc cutting have an affinity to water solubility.

In another example, water jet cutters utilize high-pressure nozzles which direct water mixed with fine-grained abrasive particles (e.g., garnet, aloxite) to wear down, shape, and cut a workpiece. This results in wastewater in which the abrasive particles are mixed with fine particles from the kerf, which can often settle to the bottom of the water pool and clog up or otherwise impede circulation.

There are numerous reasons for changing or regulating the surface level of the water pool relative to the workpiece support rails. One very important reason is to physically remove the accumulated slag or abrasive that falls to the water pool bottom. The water surface level is lowered for physical access to the debris that has accumulated on the pool bottom. However, industrial CNC cutting tables are quite large, having dimensions in the order of 6 meters (m) long and 4.5 m wide. Consequently, the volume of water supported under the workpiece support rails is significant. Moreover, after a period of use, the water may be contaminated with considerable quantities of dissolved metals, abrasives, and other hazardous compounds. Accordingly, regulation of the water table surface level by merely discharging the water into municipal sewers and replacing with fresh water is neither an economic nor environmental option.

For these and other reasons, workpiece support tables for CNC cutting systems have included closed systems, having two or more water volumes that are isolated, but hydraulically linked, whereby water is transferred between a primary pool beneath the workpiece support rails and a secondary volume. Depending on the surface level required for the primary pool, water is transferred to or from the secondary pool. Obviously, such hydraulic transfers may be effected with bi-directional pumping. However, considering the frequency and volume of such fluid transfer cycles, it has been discovered that a closed air pressure pocket, formed over the secondary volume to push or withdraw fluid to or from the primary volume, is more effective and efficient. The primary volume can be placed at a greater elevation than the secondary volume to gravitationally drain the primary volume through the linking conduits into the secondary volume, when air pressure in the pocket is reduced. Conversely, when a rise in the primary volume surface level is required, pressure in the air pocket can be increased to push water up through the linking conduits into the primary volume, thereby raising the surface level.

Depending on the elevation difference between the primary and secondary volumes, the magnitude of air pressure in the pocket determines the height of the primary volume. However, if for some reason, such as slag accumulation, flow is obstructed, through the linking conduits between the primary and secondary volumes, then the level control system may increase the pocket pressure beyond reasonable limits in a futile attempt to raise the primary volume surface level. As a result, the equipment may be damaged through leakage, and in extreme cases, workplace accidents may result from radical overpressure leading to the pocket bursting and high-pressure fluid being vented.

An example of the prior art may be found in U.S. Pat. No. 3,743,260 to Alleman, which discloses one of the earliest surface variable water tables directed specifically to plasma cutting. The Alleman apparatus includes a tank assembly having a pair of false bottom plates beneath the workpiece support surface. These false bottom plates slope from the tank sides toward the tank center but are terminated short of the center to provide a center trough for slag collection. Beneath the false bottom plates is a true tank bottom. A wedge of volumetric space is formed between the underside of the false bottom plate, the tank wall, and the true tank bottom. This wedge of space is open to the water supporting volume above the false bottom plate. When the tank is filled with water, an isolated air chamber may be charged above the water surface within the wedge volume. Depending on the air pressure within the wedge volume, water is displaced from the wedge volume to raise the surface level of the upper tank volume. Control of the air volume within the wedge volume is by means of a manual valve (53), which requires careful supervision to avoid overpressure.

U.S. Pat. No. 5,013,884 to Hahn describes a plasma arc cutting system having a water filled chamber beneath the workpiece support surface. An air pressure expansible bladder is secured within the water volume. As the bellows is expanded by air pressure, a corresponding volume of water is displaced within the chamber. Within the fixed volume of the chamber, such displaced water volume may only be accommodated by the open surface adjacent the workpiece support surface.

The water surface level of a plasma cutting table as described by U.S. Pat. No. 6,387,320 to Poulin is controlled by means of a false bottom plate secured to the true tank bottom by means of a flexible skirt. A fixed water volume in the tank above the false bottom has a controlled surface level by means of air inflated bellows positioned between the underside of the false bottom and the upper face of the true bottom. Air pressure into the bellows expands the bellows length to raise the false bottom against the fixed water volume.

A need therefore exists for a CNC cutting table in which the pressure level between the fluid volumes is protected by a failsafe mechanism, thereby reducing the considerable safety hazard associated with precisely gauging the primary and secondary fluid volumes to avoid environmental hazards that can be created by overpressure (e.g., structural failure, such as leakage and tank bursts) and under-pressure (e.g., accumulation of toxins in the work environment). The invention disclosed herein meets these needs.

SUMMARY OF THE INVENTION

The CNC cutting water table of the present invention comprises a water holding tank having a stationary false bottom plate, which is spaced closely below the workpiece support rails. The true bottom of the water holding tank is positioned below the false bottom by a distance sufficient to provide a secondary volume space of at least sufficient capacity to accommodate all of the water in the system, which is required of the primary volume between a maximum surface height and a minimum surface height.

One or more relatively large diameter fluid transfer conduits can be secured to the underside of the false bottom plate with the conduit axes aligned substantially normal to the plane of the false bottom plate. The upper distal ends of these transfer conduits can be secured to the false bottom plate with a fluid-tight seal, such as by welding. A circular junction area of the false bottom plate material, corresponding to an extension of the conduit bore, can be removed to allow fluid to flow through the conduit bore, to and from the upper surface of the false bottom.

The transfer conduit length is extended below the false bottom plate to proximity with, but not to a junction with, the water holding tank's true bottom. The bottom edges of the transfer conduits are terminated from the true bottom surface by a distance that corresponds with at least the internal flow area of the transfer conduits.

The fluid chamber between the false bottom plate and the true bottom is divided between the secondary fluid volume and an air pocket volume. The air pocket volume is served by a two way air supply and exhaust conduit. Air flow into and out of the air pocket is controlled by a primary water volume surface regulator to maintain a desired surface level relative to the workpiece support rails. This air pocket region is also served by a relief flow port that is closed by a calibrated rupture disc, which can provide an absolute guarantee that the air pocket will not be over-pressurized.

In an embodiment of the present invention, a metal cutting water table comprises a liquid holding vessel, which is positioned beneath a plurality of workpiece support rails that are secured to the liquid holding vessel in parallel alignment against a common support plane. The liquid holding vessel comprises a primary water volume, which is disposed adjacent to the workpiece support rails and above a secondary water volume, wherein the primary water volume and the secondary water volume are hydraulically linked by a plurality of conduits.

The metal cutting water table can further comprise an air volume, which can bear upon the secondary water volume to support a predetermined surface level for the primary water volume; a regulator that can be usable for controlling additions and reductions of air in the air volume; a pressure relief conduit that can open into the air volume; and a rupture disc that can be usable for closing the pressure relief conduit, or opening the pressure relief conduit at a pressure differential across the rupture disc that is equal to or exceeds a predetermined value.

The liquid holding vessel can comprise a true bottom below a false bottom, wherein a volume of space can be formed between the false bottom and the true bottom, and wherein the volume of space can be divided between the air volume and the secondary water volume. The false bottom can be penetrated by the hydraulic linking conduits, which can extend downwardly through the secondary water volume to proximity with the true bottom for linking the primary water volume with the secondary water bottom.

The rupture disc can comprise a calibrated flange plate that can rupture at the predetermined value of the pressure differential to release pressure in that air volume.

The embodiments of the present invention can include a method of preventing destructive over pressurization in a CNC cutting table, wherein the steps of the method can include securing a primary water volume, which is positioned beneath a plurality of workpiece support rails, to a water holding vessel that is in parallel alignment against a workpiece support plane, and positioning the primary water volume elevationally above a secondary water volume. The primary water volume can be hydraulically linked to the secondary water volume. The steps of the method can further include bearing a pressurized volume of air upon the secondary water volume to sustain a predetermined surface level for the primary water volume, and controlling a supply of air, pumped into said pressurized air volume, relative to a predetermined surface level for the primary water volume. The steps of the method can conclude with closing a pressure relief conduit, which is in communication with the pressurized air volume, by the use of a rupture disc, or using the rupture disc to open the pressure relief conduit at a predetermined pressure differential across the rupture disc.

The steps of the method for preventing destructive over pressurization in a CNC cutting table can further comprise the step of selecting a rupture disc that is calibrated to fail at the predetermined pressure differential.

In an embodiment, the step of positioning the primary water volume elevationally above a secondary water volume can be accomplished by the step of bearing a pressurized volume of air upon the secondary water volume.

In an embodiment, the step of controlling a supply of air pumped into the pressurized air volume can further comprise controlling the supply of air independently of the use of the rupture disc. For example, regulators can be used to regular the flow of air being pumped in and out of the water table system.

DESCRIPTION OF THE DRAWINGS

In the detailed description of various embodiments of the present invention presented below, reference is made to the accompanying drawings, in which.

DESCRIPTION OF THE INVENTION

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

The term "air" is used herein to conveniently describe any gas or compressible fluid medium that may be appropriate for a specific cutting operation. Consequently, certain workpiece materials, for reasons of health or safety, may require an inert gas, such as nitrogen. Accordingly, the term "air" is herein defined to include any compressible fluid (a gas, other fluid) suitable to the process.

Also, for reasons specific to the properties of a workpiece, the term "water" is used herein to describe any liquid or liquid solution suitable to the process for reasons of health, safety, or chemical solubility for released vapors.

Figure 1:
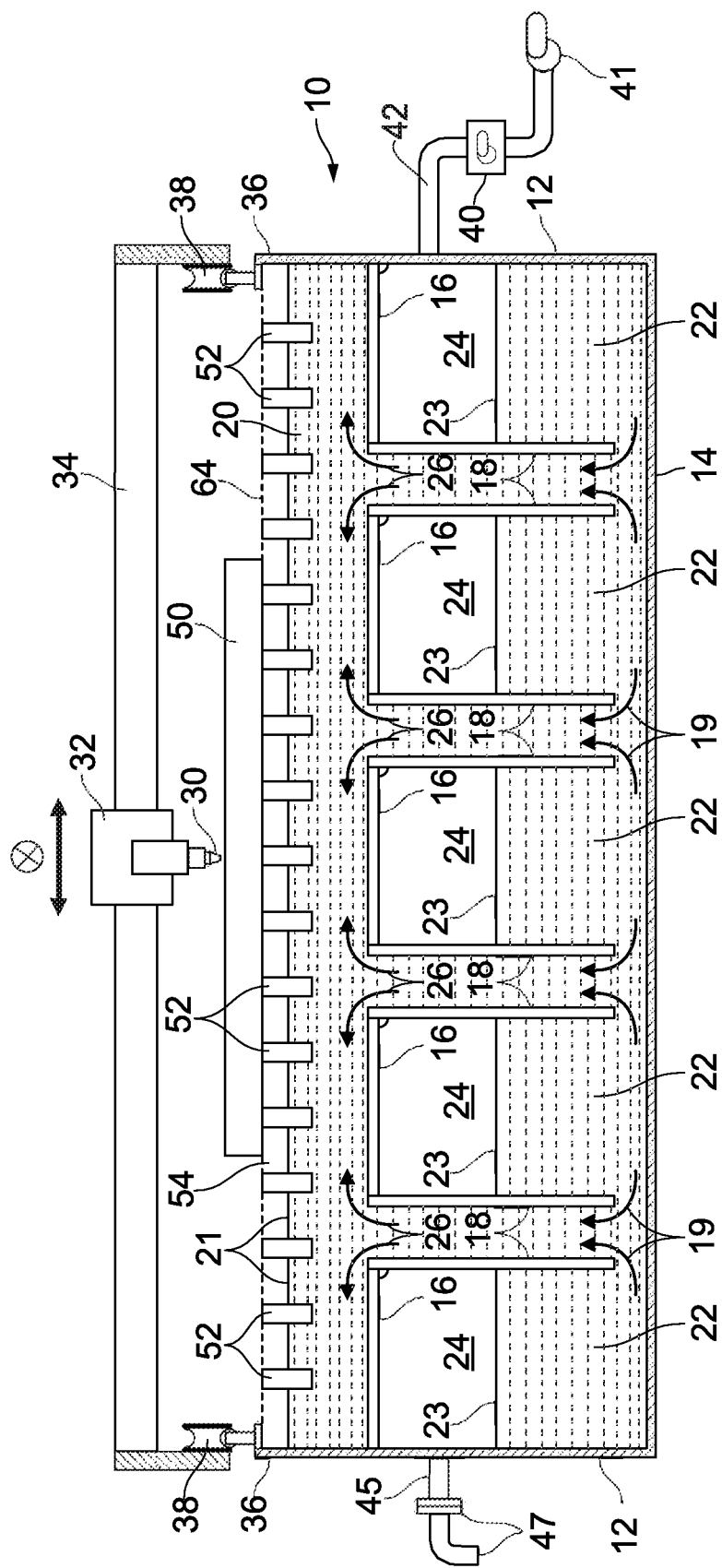
FIG. 1 is a schematic of an embodiment of the invention, which is shown as a sectioned elevation.

Referring to the schematic of FIG. 1, a cutting table surface can be formed by the upper edges of a multiplicity of support rails 52, which can be secured in a common plane 54 for the purpose of uniformly supporting a workpiece 50 along the underside of the workpiece 50. Typically, the workpiece 50 is a plate or sheet of metallic material, such as steel, aluminum, copper, brass or alloy.

The embodiment in FIG. 1 is shown with a cutting head 30 positioned over the workpiece 50, which can be secured to a position control carriage 32. Such attachment of the cutting head 30 to the position control carriage 32 may include a structural member to adjust the vertical position of the cutting head 30 relative to the workpiece 50 surface. However, other methods may be used to position the cutting head 30.

The position control carriage 32 can be supported by a transfer beam 34 for controlled positioning of the cutting head 30 transversely of the support rails 52, for example. The transfer beam 34 can be supported by, for example, tractor rolls 38 riding on parallel guide rails 36 for positioning the cutting head 30 longitudinally of the workpiece support rails 52. The guide rails 36 are frequently secured along the side walls of a fluid tank structure 10.

The parallel workpiece support rails 52, as shown, are positioned parallel with the parallel guide rails 36 and are secured along the side walls 12 of the tank 10. The schematic tank embodiment of FIG. 1 is closed between the side walls 12, in a fluid-tight manner by a true bottom 14.

Figure 2:
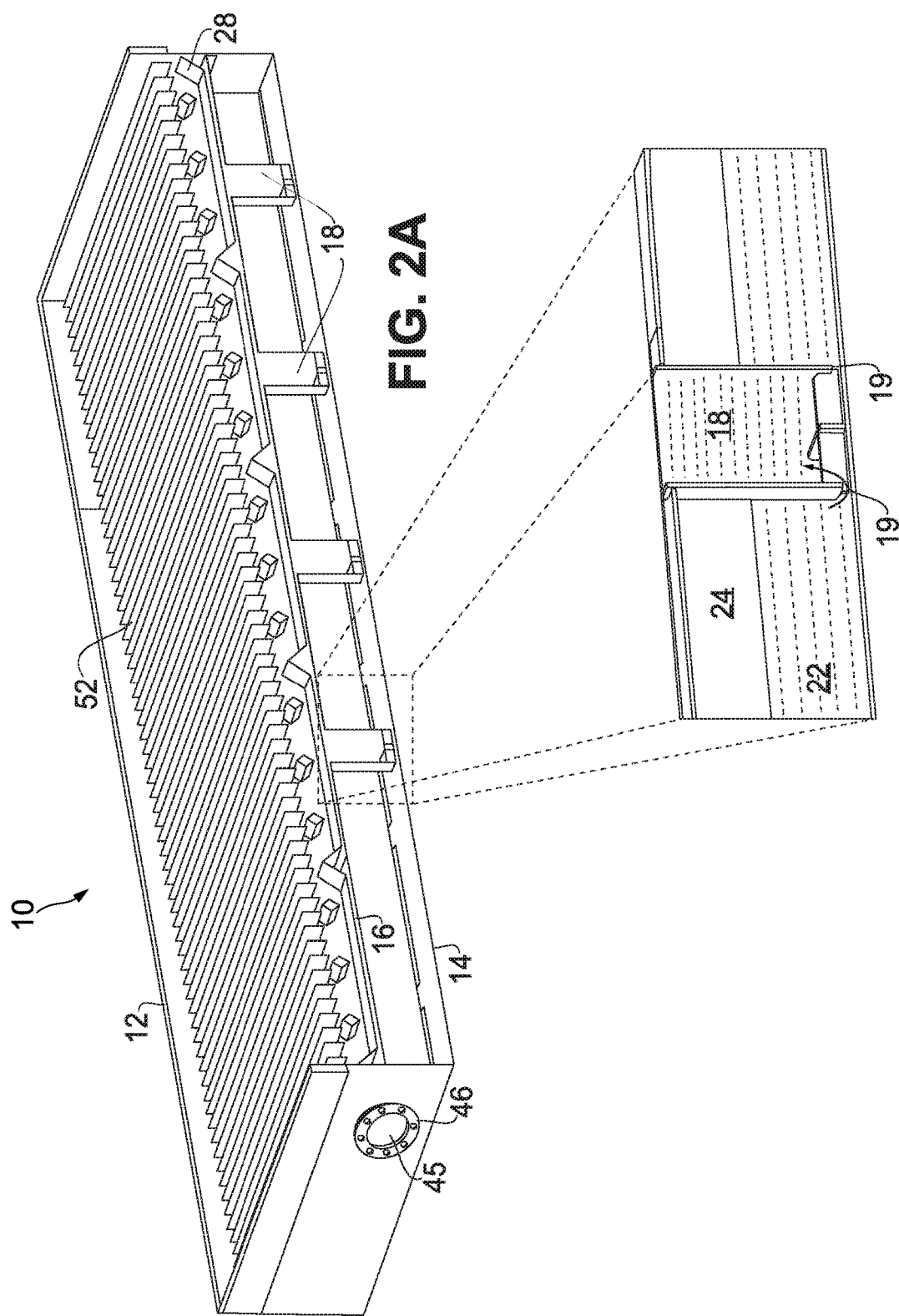
FIG. 2A is a perspective section of an embodiment of the invention.
FIG. 2B is a blown-up portion of FIG. 2A, showing the conduit in more detail.
Figure 3:
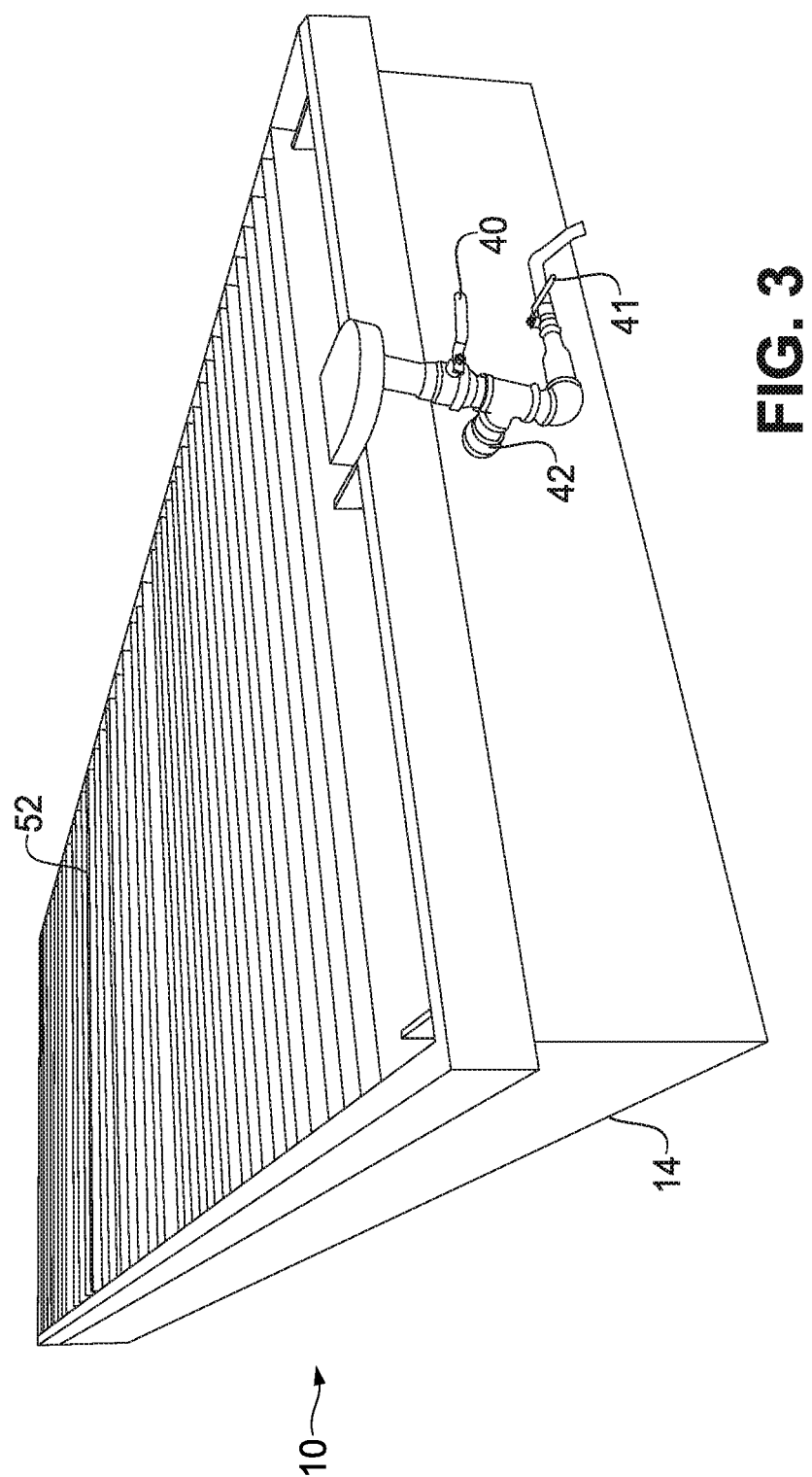
FIG. 3 is a perspective outer view of an embodiment of the invention.

It can be appreciated that this is only one exemplar method of positioning a cutting head above a workpiece and water table, and other such methods may be available for use without departing from the scope of the claimed invention. For instance, alternative structures could be used to position the cutting head 30 and position control carriage 32. For example, linear rails could be used to position the control carriage 32. The rails may be connected to the water tank or not connected. Hydraulic or electric linear actuators could be used to position the cutting head 30. The tank 10 may be an independent, free standing apparatus as depicted in FIGS. 2A-3. In this embodiment, a cutting head 30 and position control carriage 32 could be aligned over the tank 10 via independent railings (not shown), or a gantry operating at a predetermined distance and height from the workpiece support rails 52.

Between the workpiece support rails 52 and the true bottom 14 is a false bottom 16. The volumetric space between the true bottom 14 and the false bottom 16 is divided between a secondary water volume 22 and an air pocket 24. A plurality of fluid transfer conduits 18, as shown, can penetrate the false bottom 16 to hydraulically link the top side of the false bottom 16 with the secondary water volume 22. In this particular embodiment, there is a single air pocket 24 (although not visible in this two-dimensional depiction, this air pocket 24 extends laterally beyond the conduits). However, while air pocket 24 will be referred to in the singular sense for clarity, it should be understood that other embodiments of the invention may comprise multiple air pockets without deviating from the scope of this disclosure.

In an embodiment, the bottom lip 19 of each of the transfer conduits 18 can be positioned in sufficient proximity to the true bottom to limit the volume of fluid that may be transferred above the false bottom 16. The limitation occurs when the surface 23 of secondary water volume 22 is driven down by the expansion of the air pocket 24 to the level of transfer of the conduit lip 19. At that point, the gas comprising the air pocket 24 escapes up the fluid transfer conduits 18 and releases the pressure supporting a primary water volume 20 above the false bottom 16. Hence, there is a direct relationship between the surface 21 of the primary water volume 20 and the surface 23 of the secondary water volume 22 that is controlled by the volume of the air pocket 24.

Normally, the surface 21 of primary water volume 20 is maintained at a level slightly below the workpiece support rails 52. There are certain cutting tasks, however, that are preferably performed beneath the surface 21, thereby requiring more of the overall water volume to be displaced from the secondary water volume 22 into the primary water volume 20. The exact position of the surface 21 of the primary water volume 20 can be maintained by a water level sensor (not shown), such as a float controller or a light beam reflector.

Electrical signals from the water level sensor (not shown) can be received, for example, by control valves 42, 43, which can be used to regulate a connection 40 between the air pocket 24 and an air supply source 41, such as a fan or compressor. Gradual air loss from the air pocket 24 may be a normal operational condition. Accordingly, replacement air from the air supply source 41 may be required to simply sustain the surface 21 of the primary water volume surface 20 at a designated position. Obviously, additional air must be added to the air pocket 24 to raise the primary water volume surface 21, which can be accomplished through control valve 42. When primary water volume surface 21 is to be lowered, air from the air pocket 24 is released by control valve 43.

It can be appreciated that other configurations for adding air to the air pocket 24 may be utilized without departing from the scope of this disclosure. For instance, a single three-way valve might be utilized rather than two valves in series, with the third connection being a vent to release excess air if the air supply source 41 does not have the ability to vent off excess air fed back through the connection 40. A single two-way valve configuration could be used to add or release air from the air pocket 24. Alternatively, an embodiment may comprise multiple connections for introducing and removing air from the air pocket 24, each with an independent valve.

It should be understood from the level control process for the primary volume described above, the pressure in the air pocket 24, normally, will have little variation. In most applications, there are but small differences in the hydraulic head between a maximum height and a minimum height of the primary water volume surface 21. A maximum to minimum height of 1 m, for example, represents only about 10 kilopascals (kPa), while a height of 5 m may be a difference of 70 kPa, for example. Such small changes in the pressure differential range emphasize the fact that the greater air parameter change is in the volume of air required between the maximum and the minimum height of the primary water volume surface 21.

As previously explained, cutting operations can produce particles of slag, which are the cooled droplets of molten kerf material. In an embodiment, most of this slag can be collected on screens or by baskets (28, shown in FIG. 2A) that can be placed on the surface of the false bottom 16, under the workpiece 50, or over transfer conduit openings 26 through the false bottom 16. Notwithstanding such precautions, slag and other particulate debris may accumulate over time, at the relatively small openings between the transfer conduit bottom lip 19 and the true bottom 14, to substantially seal the openings and prevent a fluid transfer of water between the primary and secondary water volumes. Should the primary water volume surface 21 of the primary water volume 20 become under-pressured due to evaporation or leakage, the level controller will call for additional air to be provided into the air pocket 24. However, the volume of the air pocket 24 remains unchanged because of the closed fluid transfer conduits 18. Consequently, additional air provided into the air pocket 24 can result in an increase in the air pocket 24 pressure. If allowed to continue, the result of such a combination of factors may be to over-pressure the air pocket 24 volume, thereby resulting in damage or destruction of the equipment.

To prevent such an event of an air pocket 24 over-pressure, the present invention provides a relief conduit 45, opening into the air pocket 24, which is normally closed by a rupture disc 47. In the present embodiment, the rupture disc 47 is a material sheet that is secured across a relief conduit flow bore, such as a thin plate clamped between a pair of flanges. The material sheet or plate (i.e., rupture disc 47) is calibrated to structurally fail by rupture at a predetermined pressure differential.

Turning now to FIGS. 2A & 2B, another embodiment of the invention is shown, with the tank 10 as an independent structure omitting the cutting head 30 and related elements. In this embodiment, baskets 28 are shown above the false bottom 16 and transfer conduits 18, for collecting slag and/or abrasive material falling through support rails 52, in order to slow down the accumulation of material at the true bottom 14 and delay any obstruction of the conduit lip 19 where the water is pushed up in the direction indicated from the secondary water volume 22 by air pocket 24.

Also visible in FIGS. 2A & 2B is conduit 45, which is blocked by rupture disc 47. Rupture disc 47 can comprise any frangible material; for example, in an embodiment, the rupture disc can be made of polytetrafluoroethylene (PTFE) to minimize the risk of corrosion and weakening due to volatile solutes within the secondary water volume 22.

In this embodiment, rupture disc 47 is attached to the relief conduit 45 via a flange connection 46 located within side wall 12. However, it can be appreciated that any other suitable connection, such as a bolted or threaded connection may be used without departing from the scope of this disclosure. Additionally, it should be appreciated that rupture disc 47 may be located both within the side wall 12 as in FIGS. 2A & 2B, or external to the side wall 12 as in FIG. 1, as well as anywhere along the side wall 12 of the tank 10.

Turning now to FIG. 3, an external perspective is shown of the tank 10 and support rails 52. Air connection 40 is shown in line with control valves 42, 43. (Air supply source 41 is not shown, although it functions as it does in FIG. 1). Conduit support 45 holds air supply source 41 and control valves 42, 43 in place on side wall 14. While the air supply source 40 and the relief conduit 45 are depicted on opposing longitudinal portions of side wall 14 in this disclosure, it can be appreciated that this is not essential to the invention and that other embodiments may locate these two on the same longitudinal portion of side wall 14, or on the lateral portions of side wall 14.

Although the invention disclosed herein has been described in terms of specified and presently preferred embodiments, which are set forth in detail, it should be understood that this is by illustration only and that the invention is not necessarily limited thereto. Alternative embodiments and operating techniques will become apparent to those of ordinary skill in the art in view of the present disclosure. Accordingly, modifications of the invention are contemplated which may be made without departing from the spirit of the claimed invention.

The invention claimed is:

1. A metal cutting water table comprising:
   a vessel comprising a primary water volume located beneath a plurality of support rails, wherein the support rails are secured to the vessel in parallel alignment along a common support plane, wherein the vessel additionally comprises a secondary water volume beneath the primary water volume, and wherein the primary water volume and the secondary water volume are hydraulically linked by a plurality of water conduits;
   a true bottom below a false bottom, wherein the false bottom extends parallel with the common support plane;
   an air volume bearing upon the secondary water volume to support a predetermined surface level for the primary water volume;
   an air control conduit for controlling additions and reductions of air in the air volume;
   a pressure relief conduit opening into the air volume; and
   a rupture disc closing the pressure relief conduit, wherein the rupture disc ruptures to open the pressure relief conduit at a pressure differential across the rupture disc that is equal to or exceeding a predetermined value.

2. The metal cutting water table of claim 1, wherein a volume of space is between the false bottom and the true bottom, and wherein the volume of space is divided between the air volume and the secondary water volume.

3. The metal cutting water table of claim 2, wherein the water conduits penetrate the false bottom and extend downwardly through the secondary water volume.

4. The metal cutting water table of claim 3, comprising a gap between the water conduits and the true bottom, wherein the secondary water volume flows into the water conduits through the gap.

5. The metal cutting water table of claim 1, wherein the rupture disc comprises a calibrated flange plate that ruptures at the predetermined value of the pressure differential to release pressure in the air volume.

6. The metal cutting water table of claim 1, wherein the rupture disc comprises polytetrafluoroethylene.

7. The metal cutting water table of claim 1, wherein the rupture disc is secured to the pressure relief conduit with a flange connection, bolt connection, threaded connection, or combinations thereof.

8. The metal cutting water table of claim 1, wherein the air control conduit comprises a first valve and a second valve, wherein the first valve actuates to add air to the air volume, and wherein the second valve actuates to remove air from the air volume.

9. A method of preventing destructive over pressure in a plasma arc cutting table, wherein the method comprises the steps of:
  securing a primary water volume positioned beneath a plurality of workpiece support rails to a water holding vessel in parallel alignment against a workpiece support plane;
  positioning the primary water volume elevationally above a secondary water volume and hydraulically linking the primary water volume to the secondary water volume via a plurality of water conduits;
  bearing a pressurized volume of air upon the secondary water volume to sustain a predetermined surface level for the primary water volume, the pressurized volume of air being provided above a true bottom of the water holding vessel and below a false bottom of the water holding vessel, the false bottom extending parallel with the workpiece support plane;
  controlling a supply of air, pumped into the pressurized air volume, relative to a predetermined surface level for the primary water volume; and
  closing a pressure relief conduit in communication with the pressurized air volume with a rupture disc that opens the pressure relief conduit at a pressure differential across the rupture disc that is equal to or exceeding a predetermined value.

10. The method of claim 9, further comprising the step of selecting a rupture disc that is calibrated to fail at the predetermined pressure differential.

11. The method of claim 9, wherein the step of positioning the primary water volume elevationally above a secondary water volume is accomplished by the step of bearing a pressurized volume of air upon the secondary water volume.

12. The method of claim 9, wherein the step of controlling a supply of air pumped into the pressurized air volume further comprises controlling the supply of air independently of the use of the rupture disc.

13. The method of claim 12, wherein the step of controlling a supply of air pumped into the pressurized air volume further comprises actuating a first valve to increase the supply of air to the pressurized air volume, and actuating a second valve to release the supply of air within the pressurized air volume.

14. The method of claim 13, wherein the steps of actuating the first valve and actuating the second valve are controlled by a sensor in accordance with the predetermined surface level.

15. The method of claim 9, wherein the step of closing the pressure relief conduit with the rupture disc further comprises connecting the rupture disc to the pressure relief conduit with a flange connection, bolt connection, threaded connection, or combinations thereof.

16. The method of claim 9, wherein the step of bearing a pressurized volume of air upon the secondary water volume to sustain the predetermined surface level is accomplished by forcing a portion of the secondary water volume upward through the plurality of water conduits that are physically separated from the pressurized air volume.

* * * * *